United States Patent
Derrien et al.

(10) Patent No.: US 11,453,155 B2
(45) Date of Patent: Sep. 27, 2022

(54) METHOD FOR PRODUCING A PLASTIC CONTAINER

(71) Applicant: SIDEL PARTICIPATIONS, Octeville-sur-Mer (FR)

(72) Inventors: Mikael Derrien, Octeville-sur-Mer (FR); Laurent Penet, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 17/292,317

(22) PCT Filed: Oct. 30, 2019

(86) PCT No.: PCT/FR2019/052576
§ 371 (c)(1),
(2) Date: May 7, 2021

(87) PCT Pub. No.: WO2020/094947
PCT Pub. Date: May 14, 2020

(65) Prior Publication Data
US 2021/0394424 A1    Dec. 23, 2021

(30) Foreign Application Priority Data
Nov. 8, 2018   (FR) ...................... 1871411

(51) Int. Cl.
*B29C 49/62*   (2006.01)
*B29C 49/42*   (2006.01)
(Continued)

(52) U.S. Cl.
CPC .............. *B29C 49/78* (2013.01); *B29C 49/12* (2013.01); *B29C 49/62* (2013.01); *B29L 2031/7158* (2013.01)

(58) Field of Classification Search
CPC ...... B29C 49/62; B29C 49/4284; B29C 49/78
See application file for complete search history.

(56) References Cited

U.S. PATENT DOCUMENTS

2010/0301523 A1   12/2010   Gillet
2015/0174813 A1   6/2015    Hanschuh
(Continued)

FOREIGN PATENT DOCUMENTS

DE   202009006684 U1   8/2009

OTHER PUBLICATIONS

International search report dated Feb. 14, 2020.

*Primary Examiner* — Robert B Davis

(57) ABSTRACT

The invention relates to a process for production of a container by blowing or blowing-stretching within a production unit comprising a mold and a nozzle which is designed to close the mold hermetically. The process comprises a sequence of forming with a blowing phase and a phase of degassing. The degassing phase comprises spacing the nozzle from the mold in order to interrupt the hermetic closure. The spacing of the is nozzle carried out (i) after the beginning of the degassing phase, when the pressure in the interior of the container has dropped and has reached an intermediate pressure which is lower than the pressure at the end of the forming sequence, and is between 14 and 3 bars or (ii) after completion of the blowing phase, and within an interval of time of between 0 and 200 ms after the stoppage of the injection of gas into the container.

18 Claims, 5 Drawing Sheets

(51) Int. Cl.
  *B29C 49/78* (2006.01)
  *B29C 49/12* (2006.01)
  *B29L 31/00* (2006.01)

(56) References Cited

U.S. PATENT DOCUMENTS

| | | | |
|---|---|---|---|
| 2015/0209997 A1* | 7/2015 | Lemble | B29C 49/783 264/529 |
| 2015/0290867 A1 | 10/2015 | Derrien | |
| 2016/0332357 A1 | 11/2016 | Gendre | |

* cited by examiner

METHOD FOR PRODUCING A PLASTIC CONTAINER

The field of the invention is that of production of containers made of plastics material, from blanks.

More specifically, the invention relates to production, in a production unit, with at least one mold, of containers made of plastics material which have good mechanical properties, comprising a phase of blowing or stretching-blowing of preforms in said molds.

Whether a pre-form or an intermediate container having already been subjected to a preforming operation is involved, a blank comprises a body, which is generally cylindrical of revolution, a neck which constitutes the edge of the container to be formed, and a base which closes the body opposite the neck.

The conventional production technique consists of introducing the blank, previously heated to a temperature higher than the temperature of vitreous transition of the material (approximately 76° C. in the case of PET), into a mold provided with a wall defining a cavity corresponding to the impression of the container, and of injecting a gas under pressure (generally air) into the blank, via the neck, in order to place the material against the wall of the mold.

The production comprises a sequence of forming (by blowing or stretching-blowing) which in general includes a prior, so-called pre-blowing phase, during which the gas is injected via a nozzle at a relatively low pre-blowing pressure (ordinarily 15 bars or less), followed by blowing phase, during which gas is injected at a high blowing pressure (ordinarily 20 bars or more, and as much as 40 bars). The forming sequences is followed by a degassing phase, consisting of discharging the gas contained in the interior of the container, so that its internal pressure drops to atmospheric pressure.

Under the effect of the pressure, the material which is softened by the heating forms a bubble which inflates, and develops both in an axial direction, parallel to the main axis of the mold, and in a radial direction, perpendicular to the axis of the mold.

In order to avoid any misalignment of the container (thus making it possible to ensure good distribution of the material which constitutes the blank in the finished container), the axial stretching of the blank can be forced by means of a rod, known as a stretching or elongation rod, which can be displaced axially in the mold during the pre-blowing and/or the blowing. In this case, reference is made to production by stretching-blowing. This rod comprises a distal end which thrusts the base of the blank until it is placed against a mold base corresponding to the impression of the base of the container. Hereinafter in the description, the term "blowing" will apply equally to simple blowing or to stretching-blowing.

It should be remembered that the production can be carried out in so-called "cold" molds: these are molds which are tempered (maintained at ambient temperature) or cooled by circulation of a liquid coolant (cooled water). It can also be carried out in so-called "hot" molds: these are molds which are heated by heating elements or by circulation of a hot fluid (hot oil for example).

The cold molds are used for so-called standard applications, where the containers are not subjected to stringent conditions of use, whereas the heated molds are used to produce containers which are subjected to more stringent conditions of use (hot filling).

During production with cold molds, when taking of the impression is completed (the time necessary for taking of the impression is determined during the parametrization of the production unit), the blowing phase is completed by stopping the injection of the blowing gas at high pressure, and the degassing phase is then begun in order to discharge the gas under pressure in the interior of the container formed, until the interior of the container reaches a pressure equal to atmospheric pressure. The forming sequence thus comprises the pre-blowing phase, with injection of the pre-blowing gas, then the blowing phase, with injection of the blowing gas at high pressure. The forming sequence is followed by the degassing phase.

During production with hot molds, the blowing phase can be broken down into two sub-phases, i.e. a first sub-phase, known as the blowing phase, during which the injection of the blowing gas takes place at high pressure, and a second sub-phase, known as sweeping, which takes place when the taking of an impression caused by the high pressure is completed, during which addition of gas at high pressure is maintained, but controlled escape takes place, such that the walls of the containers are detached slightly from the walls of the molds. The sweeping is carried out by giving rise to said controlled escape of the gas contained in the container while gas under pressure is still being injected, not only via the blowing nozzle, but also via one or a plurality of holes provided in the stretching rod, in order to maintain a significant residual pressure in the interior of the container (generally between 8 bars and 12 bars). After the sweeping, a degassing phase is begun in order to discharge the gas under pressure in the interior of the container formed, until the interior of the container reaches a pressure equal to atmospheric pressure. Generally, the degassing phase is begun when the pressure in the container is approximately 10 bars. In this case, the forming sequence thus comprises the phase of pre-blowing, with injection of the pre-blowing gas, then the blowing phase, with its two sub-phases. The forming sequence is followed by the degassing phase. A production process with hot molds makes it possible to obtain heat-setting of the material which constitutes the container, and relaxing of the stresses which are induced during the stretching and blowing. For containers which are hot filled, the temperature of the molds is higher than the filling temperature, such that, when the containers are filled at a lower temperature, their component material is not deformed because it has already been subjected to a higher temperature.

Whether hot or cold molds are involved, the degassing phase is carried out via the nozzle which comprises a degassing circuit, making it possible to direct the gas under pressure from the interior of the container to the exterior of the production unit, leading to exhaust mufflers. It will be remembered that the degassing consists of making the pressure drop from a value which is higher than 20 bars (and can be as much as 40 bars), to atmospheric pressure. The differential is very substantial, and is the cause of considerable noise if precautions are not taken.

Advantageously, a phase of recuperation of the gas under pressure can be provided for purposes of recycling and ecology. Consequently, the gas under pressure thus recuperated can for example be reused during the pre-blowing phase and/or part of the blowing phase which is implemented during the production of a subsequent container; it can also be recuperated to drive or assist in the driving of units of the production machine (jacks, actuators, etc.).

The phase of degassing of a container formed in a cold mold can be broken down into two successive sub-phases.

During the first sub-phase, there is a significant decrease in the pressure in the container in a short period of time.

More specifically, the pressure drops from the pressure remaining in the container at the end of the forming sequence (between approximately 20 bars and 40 bars) to approximately 10 bars, in a few milliseconds. For example, in a cold mold process, for a container with a capacity of 2 liters formed with a blowing pressure of 40 bars, the pressure drops from 40 bars to approximately 10 bars in less than 100 ms.

During the second sub-phase, the pressure in the container continues to decrease until atmospheric pressure is reached. This second sub-phase can be longer than the first sub-phase, even when the variation of pressure during this second sub-phase is lower than that which takes place during the first sub-phase.

In other words, the decrease in the pressure in the container during the degassing phase is not linear: the second sub-phase, which allows atmospheric pressure to be reached starting from the moment when the residual pressure is 10 bars or less, is relatively lengthy compared with the first, during which the pressure in the container drops from the pressure value at the end of the forming sequence to 10 bars (the duration of the second sub-phase can be greater than 175 milliseconds for a container with a capacity of 2 liters). It should also be noted that, in the case when the degassing phase comprises phases of recuperation of the gas, this degassing phase is punctuated by small steps which increase the duration of degassing further.

As previously indicated, in the case of containers which are formed in a hot mold, the degassing phase, which follows the sweeping sub-phase, is begun while the residual pressure in the container is approximately 8 to 12 bars. Thus, this degassing phase is comparable to the second degassing sub-phase which takes place in the case of cold molds.

In addition, in order to obtain a container with good mechanical properties, it will be remembered that the material which constitutes the blank must be maintained in contact with the mold for as long as possible by the gas under pressure.

However, maintenance in contact of this type cannot last indefinitely, in particular in order to comply with the constraints of production paces which are continually increasing. Furthermore, the reduction of the blowing pressures for environmental reasons (which involves the use of compressors which consume less energy) has the effect of reducing the time of maintenance of the container at the maximal pressure peak, and thus the time of contact between the material and the mold.

In this context, container manufacturers must fulfil a demand which is increasingly great in terms of numbers of units to be produced, whilst maintaining the quality of the containers and reducing the associated energy consumption.

For this purpose, the ideal solution would be to propose production cycle times which are as short as possible. However, the reduction of the production cycle time could give rise to a risk of deterioration in terms of quality. In fact, a reduction of the cycle time generally takes place by means of a decrease in the time of maintenance of the material against the walls of the mold, coupled with a reduction in the blowing pressure. However, the association of the reduction in the time of maintenance under pressure and a decrease in the blowing pressure can lead to poor formation of the packaging (in particular at its parts which are the most complex to form), which, as well as affecting the aesthetic appearance, can also have a negative impact on the mechanical strength of the packaging. In order to maintain a cycle time which could be classified as standard while fulfilling the increasing demand, it can also be possible to increase the number of production units, but this represents a substantial cost, and requires a large amount of space. This therefore results in a negative situation in terms of ecology, since the resources which are necessary for the production of the containers (gas under pressure and electricity in particular) are increased. This therefore goes against the trend being followed by container manufacturers, who are hoping to consume less energy in their production units and make them more environmentally friendly.

The objective of the invention is in particular to eliminate the disadvantages of the prior art, whilst being applicable to processes which implement cold molds, as well as hot molds.

More specifically, the objective of the invention is to propose a process for production of a container which can use a blowing pressure lower than in the prior art, whilst maintaining the quality level of the container is thus obtained.

The objective of the invention is also to provide a process of this type which permits maintenance of the material for longer on the walls of the mold than in the prior art, without increasing the total cycle time.

The objective of the invention is additionally to provide a process of this type which can be adapted to production units already in existence.

These objectives, as well as others which will become apparent hereinafter, are achieved thanks to the invention, the subject of which is a process for production of a container by blowing starting from a pre-form made of plastics material within a production unit, the production unit comprising a mold defining an impression for the container to be formed, and a nozzle which is designed to close the mold hermetically, the production process comprising:

a sequence of forming by blowing, with a blowing phase comprising at least the injection and maintenance of a gas under pressure in the pre-form, via the nozzle, in order to deform the pre-form until it matches the impression of the mold, and obtain a container;

a phase of degassing of the container formed, consisting of discharging the gas contained in the container at the end of the forming sequence, in order to take the interior of the container to atmospheric pressure;

and wherein, during the degassing phase, the nozzle is spaced from the mold in order to interrupt the hermetic closure, so as to put the interior of the container into direct fluid communication with the atmosphere, the spacing of the nozzle being begun:

after the beginning of the degassing phase, when the pressure in the interior of the container has dropped and has reached a predetermined pressure which is lower than the pressure at the end of the forming sequence, and is between 14 and 3 bars;

or:

after completion of the forming sequence, and at a predetermined instant which takes place within an interval of time of between 0 and 200 ms after the stoppage of the injection of gas into the container.

The spacing of the nozzle from the mold ensures direct putting into fluid communication between the interior of the container formed and the atmosphere. Consequently, the pressure drop in the container formed takes place almost instantaneously, without the escape of the gas at the end of the forming sequence being disrupted or slowed down by any circuit or unit such as an exhaust muffler. Thus, when comparing the phenomena relating to two identical containers formed with the same high-pressure level, one of them implementing the invention, and the other implementing a prior process, it is found that the spacing of the nozzle from the mold makes it possible to reduce the duration of the degassing phase by at least half compared with the processes according to the prior art.

This rapid degassing provides various advantages.

In the case of cold molds, it makes it possible to maintain the high blowing pressure for longer before giving rise to the degassing, without the production pace being affected in comparison with the prior art.

Again in the case of cold molds, the cooling is assisted by the fact that the material is in contact for longer with the molds which are thermally regulated to a temperature lower than the temperature of the plastics material at the end of blowing.

In the case of hot molds, the total duration of the forming sequence can be increased, by increasing the duration of the blowing sub-phase and/or that of the sweeping sub-phase. This makes it possible in all cases to increase the time of contact (or maintenance) of each container with its production mold, and consequently to assist the taking of an impression, and ultimately to improve the mechanical and thermal properties of the containers obtained. In fact, since the internal pressure to which the container is subjected during production is maintained for longer, the material has time to be distributed well and match the form of the mold.

The mechanical strength of the containers is assisted, since each container is designed in a manner which is optimized not only for aesthetic purposes, but also for technical purposes. The better the taking of an impression, the better the container will comply with the specifications for which it has been designed. The process makes it possible to obtain complex forms with excellent quality, whether cold molds or hot molds are used.

In addition, since the expansion of the gas in the container during the degassing is far more rapid with the invention, the cooling effect which is associated with the expansion is improved in comparison with the implementations according to the prior art. The mechanical strength of the containers is thus improved, since the containers are removed from the molds better cooled and rigidified. This results in a considerable reduction in the phenomena of shrinkage of the material when the containers are removed from the molds.

Finally, for an identical production pace and quality of container, a degassing phase of this type makes it possible to reduce the energy consumption of the production unit by approximately 10% in comparison with a conventional process, in particular in terms of consumption of gas injected. In fact, the prolonged maintenance of the material of the container against the mold permits the use of a high blowing pressure which is lower than in the prior art, without detracting from the quality of the container, or even improving it.

In this operating mode, it is apparent that a phase of recuperation of the gas cannot be incorporated during the degassing, but it must be borne in mind that an increasing number of cases, the reduction in the blowing pressure made possible by the technical improvements, in particular when these pressures are approximately 20 bars or less, is making implementation of a recuperation phase increasingly redundant.

According other characteristics, taken alone or in combination:
- the sequence of forming by blowing is accompanied by axial stretching of the pre-form;
- the process is implemented in a hot mold, and comprises a sweeping sub-phase which takes place during the blowing phase immediately before the degassing, and during which controlled escape of the gas is caused and a sweeping gas is injected into the container, and upon completion of which sub-phase a pressure of between 8 and 12 bars remains in the container, and the spacing of the nozzle is begun immediately at the end of the degassing sub-phase, upon stoppage of the injection of sweeping gas into the container;
- the spacing of the nozzle relative to the mold is begun during the phase of degassing of the container, after the degassing has been started by a degassing circuit of the production unit, when the predetermined pressure in the container formed reaches the value of a set pressure;
- the set pressure which controls the spacing of the nozzle from the mold is set to between 14 and 3 bars;
- the set pressure which controls the spacing of the nozzle is determined by an operator of the production unit, in other words by a person in charge of its control;
- the set pressure which controls the spacing of the nozzle is determined by an automaton of the production unit, according to data of pressure and of the volume of the article produced, or according to a noise measurement;
- the spacing of the nozzle from the mold is controlled after completion of the forming sequence, and after stoppage of the injection, by means of a set time;
- the set time which controls the spacing of the nozzle from the mold is between 0 and 200 ms;
- the set time which controls the spacing of the nozzle is determined by an operator of the production unit;
- the set time which controls the spacing of the nozzle is determined by an automaton of the production unit, according to a noise measurement carried out in the production unit.

Other characteristics and advantages of the invention will become more apparent from reading the description, to be understood by way of non-limiting illustration, and from the appended drawings in which.

Figure 4:
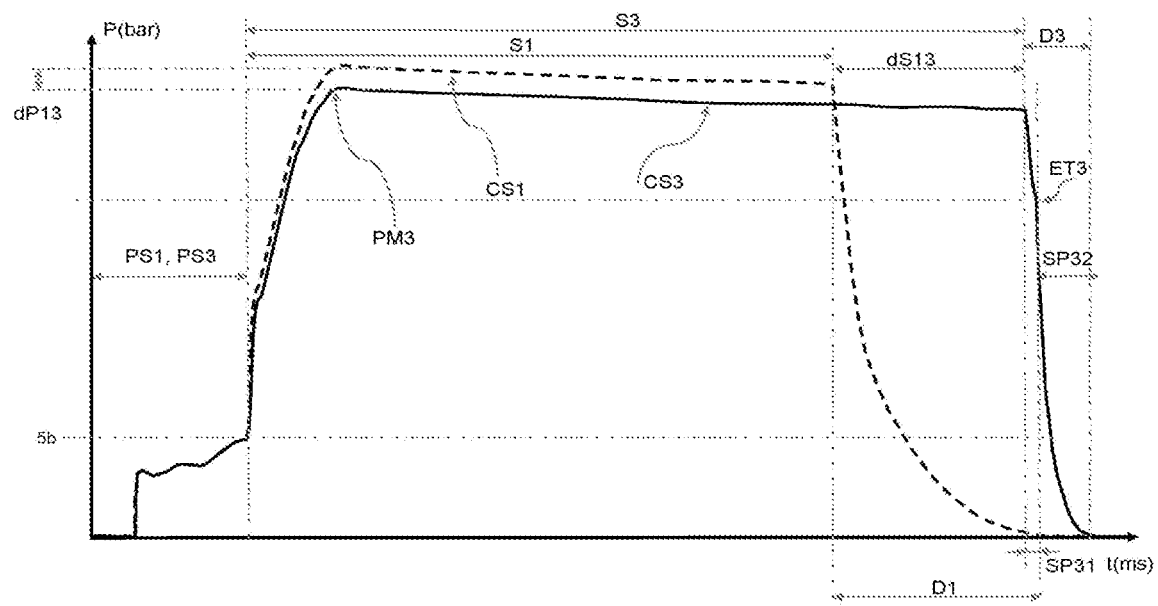
Figure 5:
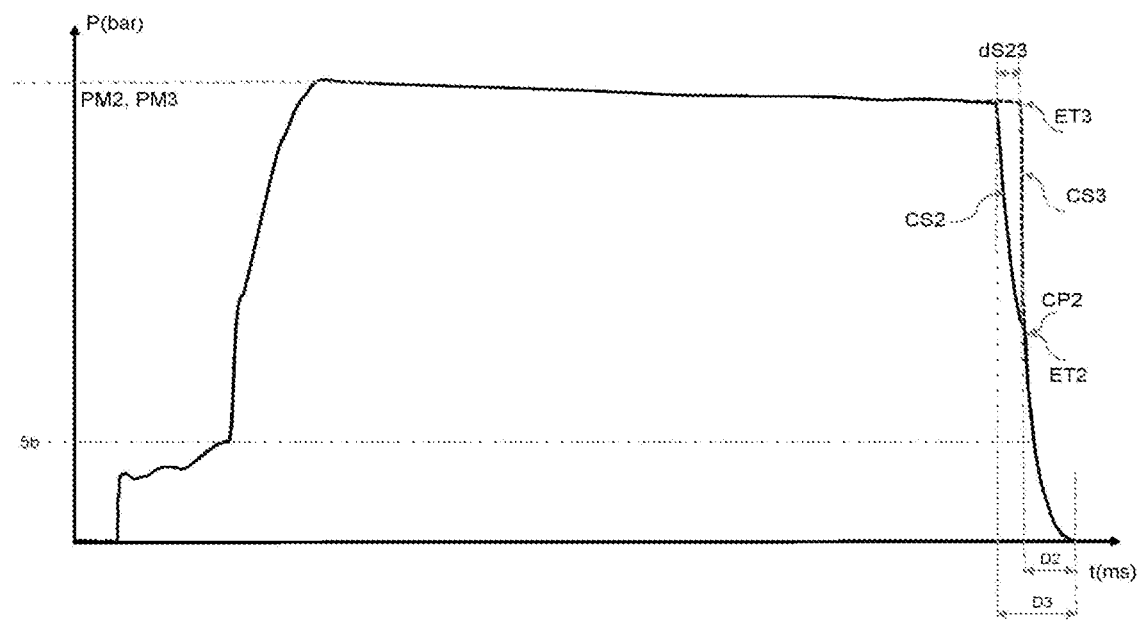
Figure 6:
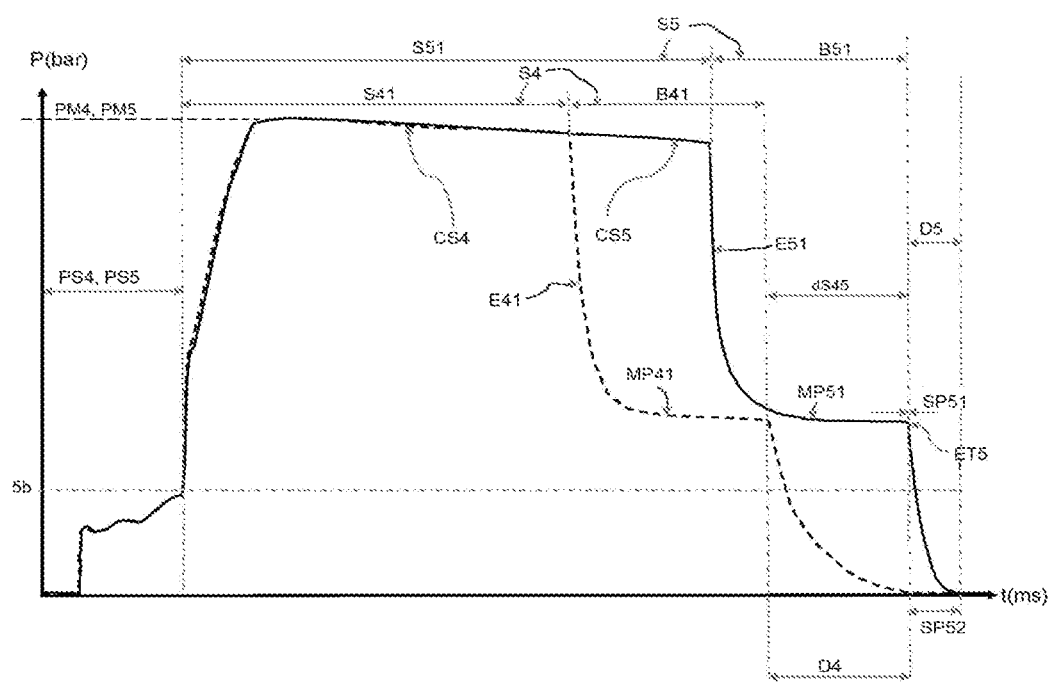

FIG. 4 is a schematic view showing a blowing curve of a container according to a standard production process, and, superimposed, a blowing curve of a container according to the second alternative of the production process according to the invention, in the case where the spacing of the nozzle is begun with a delay after the end of the blowing (i.e. with a time between the end of the blowing and the start of the spacing of the nozzle which is strictly greater than 0);

FIG. 5 is a schematic view showing a blowing curve of a container according to the first alternative of the production process according to the invention, and, superimposed, a blowing curve of a container according to the second alternative of the production process according to the invention, in the case where the spacing of the nozzle is begun with a delay after the end of the blowing (i.e. with a time between the end of the blowing and the start of the spacing of the nozzle which is greater than 0);

FIG. 6 is a schematic view showing a blowing curve of a container produced in a hot mold without implementation of the invention, and, superimposed, a blowing curve of a container produced in a hot mold implementing the invention.

Figure 1:
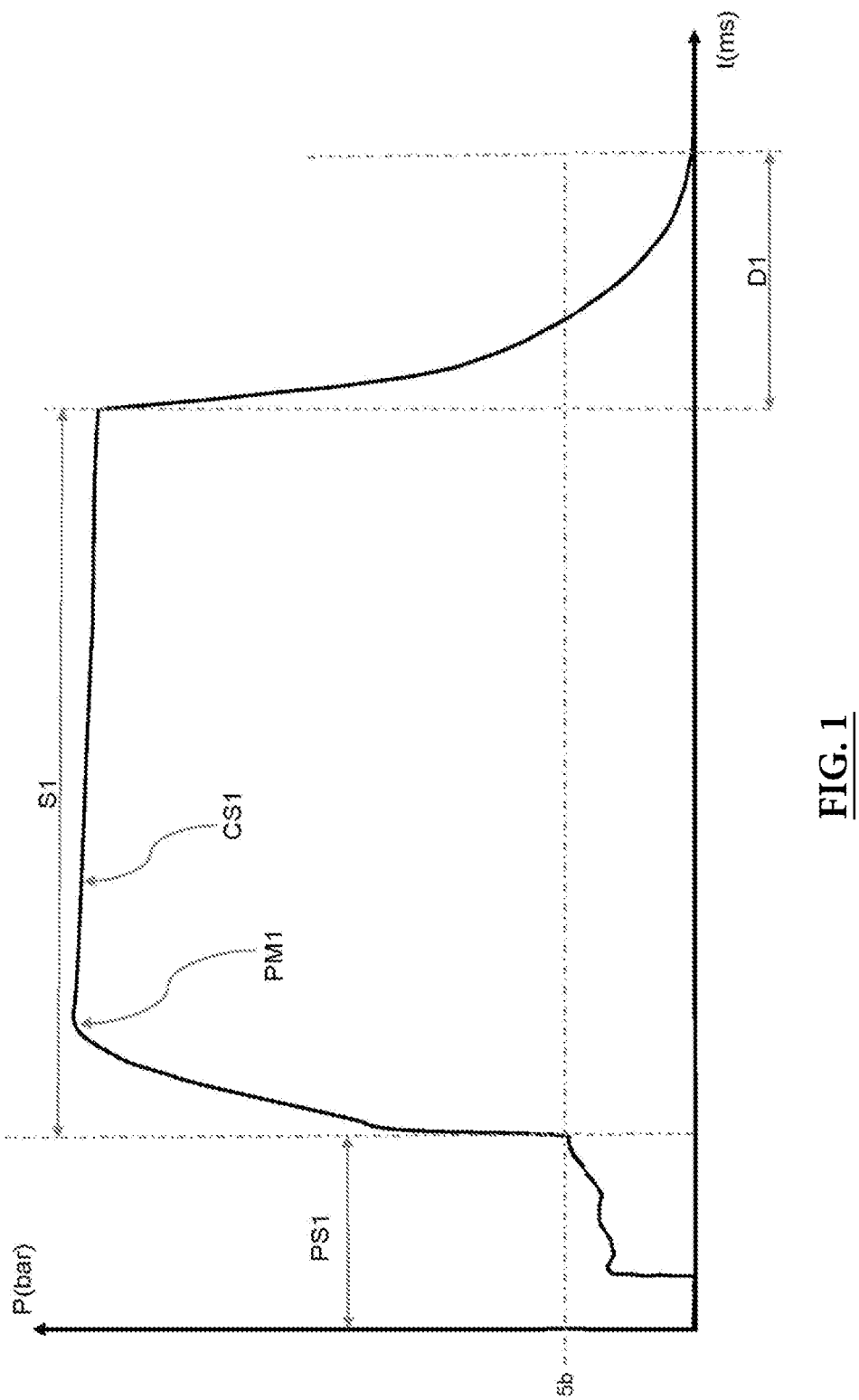
FIG. 1 is a schematic view showing a blowing curve of a container according to a standard production process in a cold mold.

FIG. 1 shows a first blowing curve CS1 of a container, which represents a so-called standard production (or forming) cycle of a container by blowing or stretching-blowing starting from a pre-form made of plastics material within a production unit which uses one or more cold molds. Conventionally, the production unit comprises a mold which defines an impression of the container to be formed, and a nozzle which is designed to close the mold hermetically.

Conventionally, a blowing curve CSx (with "x" defining a curve index in this case) represents the development of the pressure (Y-axis) in a container on a time basis (X-axis).

Each blowing curve has at least the following three phases:
a pre-blowing phase PSx;
a blowing phase Sx;
a degassing phase Dx.

Considered together, the pre-blowing phase and the blowing phase concerned will be known as the forming sequence.

As will be indicated in greater detail hereinafter, in the case of cold molds, the blowing phase consists of a simple injection of high-pressure gas. In other words, this phase comprises only a single step. On the other hand, in the case of hot molds, the blowing phase comprises two sub-phases (or successive steps), i.e. a sub-phase of blowing with injection of high-pressure gas followed by a sub-phase of sweeping.

In order to simplify the terminology, hereinafter in the present description and in the claims, by convention, the different phases and sub-phases which will be mentioned will be identified equally well by their duration. Thus, a "phase PSx" will mean a phase with a duration PSx; similarly, a "duration PSx" can be understood as meaning a phase PSx, and therefore as a phase with a duration PSx.

The same convention will apply to the phases Sx, to the phases Dx, and to the sub-phases SPx.

The pre-blowing phase PSx and the blowing phase Sx comprise injection of a blowing gas under pressure into the pre-form via the nozzle, in order to deform the pre-form until it matches the impression of the mold, and to obtain a container.

More specifically, during the pre-blowing phase PSx, the pressure increases in the container being formed up to a limit pre-blowing value, for example 5 bars, as illustrated in FIGS. 1 to 5.

Once the pre-blowing phase PSx has ended, the blowing phase is begun; the pressure in the container is increased until the blowing pressure is reached, which pressure is maintained substantially constant until the end of the blowing phase. The plastics material is then introduced and maintained placed against the walls of the mold with the impression of the container to be produced.

As indicated, axial stretching can be carried out during the forming sequence.

The degassing phase then takes place, during which the pressure in the container decreases until atmospheric pressure is reached.

Figure 2:
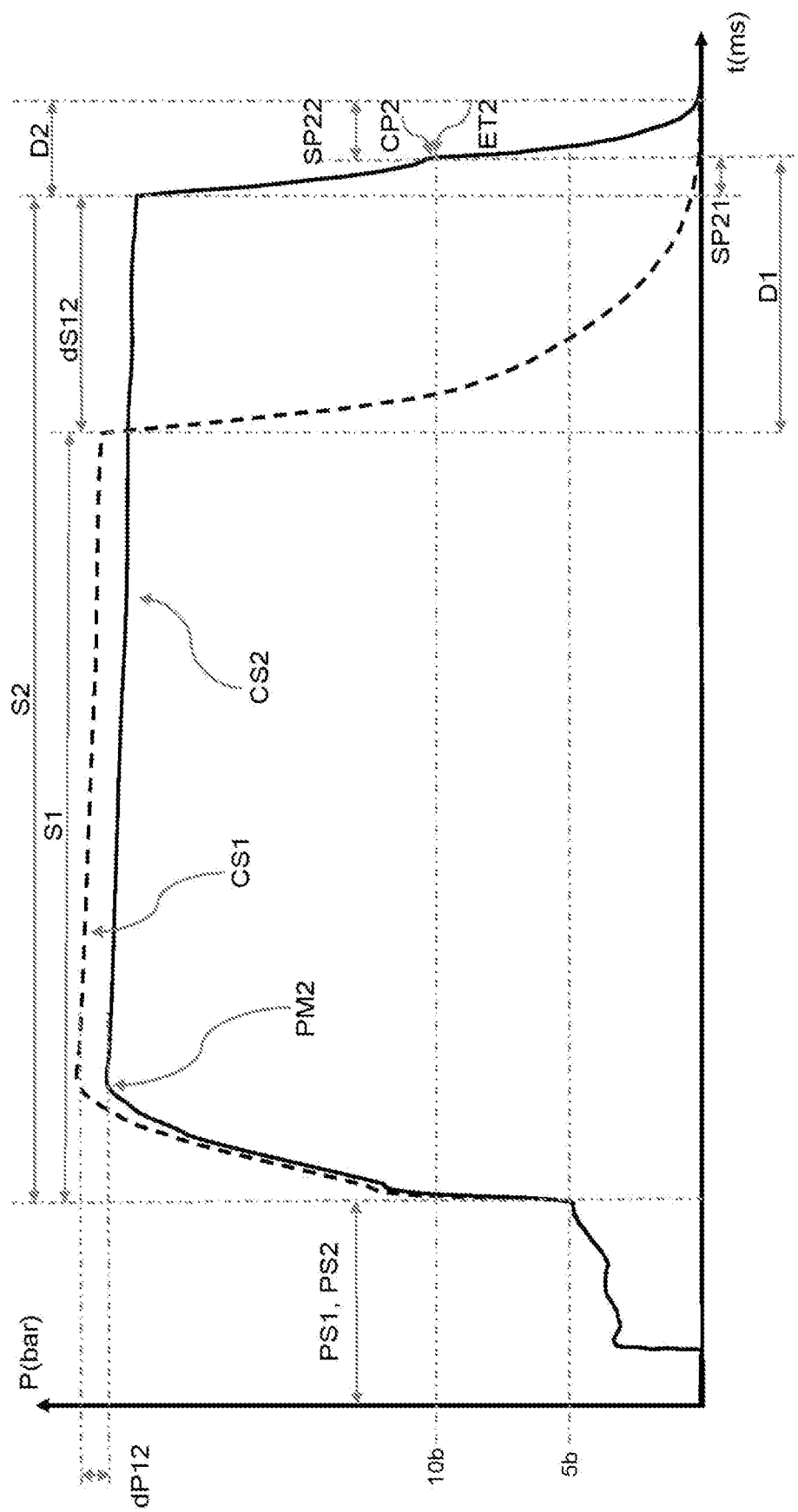
FIG. 2 is a schematic view showing a blowing curve of the container according to a standard production process, and, superimposed, a blowing curve of a container according to the first alternative of the production process according to the invention.
Figure 3:
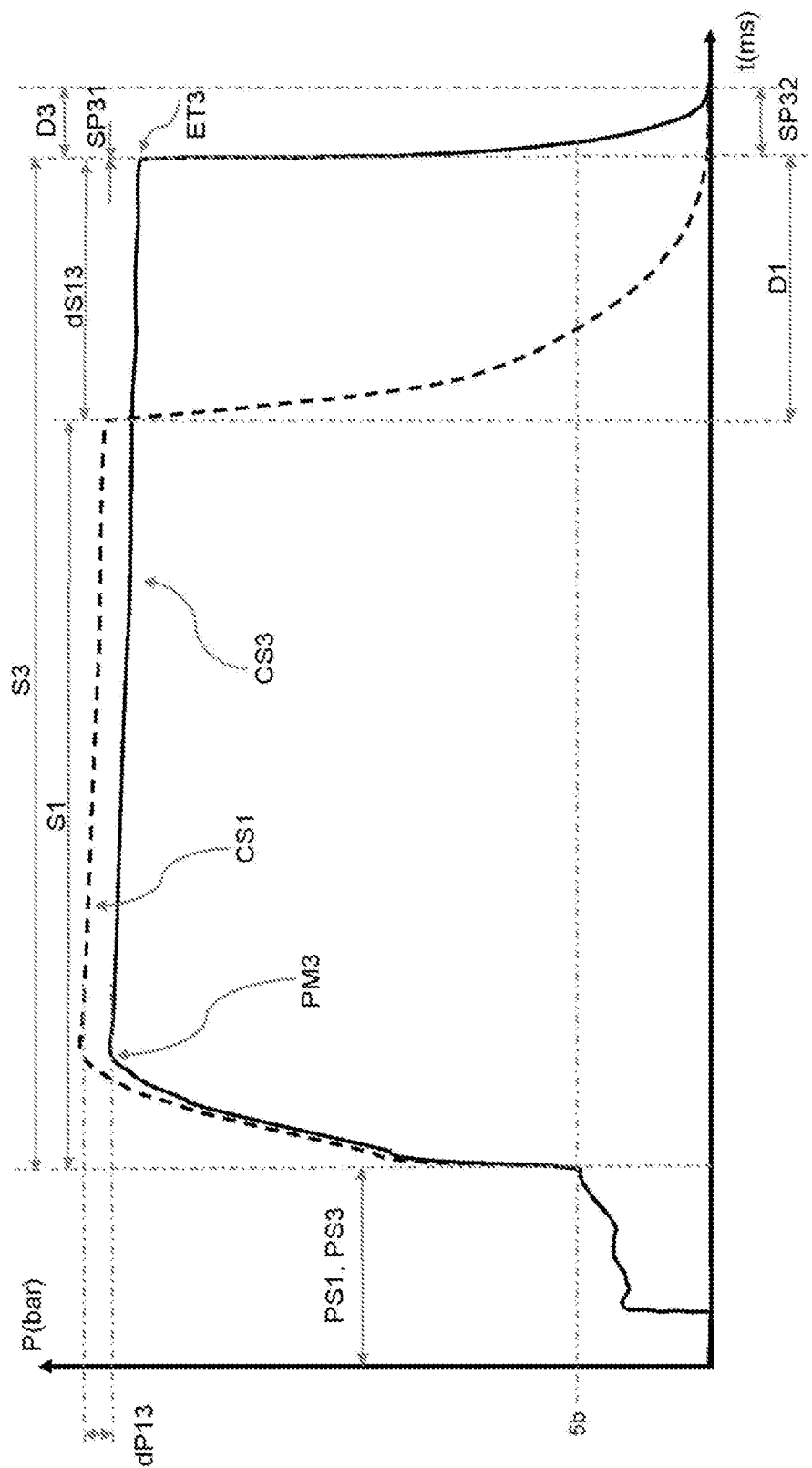
FIG. 3 is a schematic view showing a blowing curve of the container according to a standard production process, and, superimposed, a blowing curve of a container according to the second alternative of the production process according to the invention, in the case where the spacing of the nozzle is begun immediately after completion of the blowing phase.

The blowing curves CS1 according to a standard production process shown in FIG. 1, CS2 according to a first alternative of the process according to the invention shown in FIGS. 2 and 5, and CS3 according to a second alternative of the process according to the invention shown in FIGS. 3, 4 and 5, illustrate by way of non-limiting example ways of producing a container with a capacity of 2 liters in cycles with a total duration of approximately 1.4 seconds, which represents a unit production pace of 1800 bottles per hour per mold.

With reference to FIG. 1, the blowing curve CS1 of the standard process has a pre-blowing phase PS1 which ends when the pressure in the container reaches approximately 5 bars. The duration of this phase can be approximately 200 ms.

Once the pre-blowing phase PS1 has ended, the blowing phase S1 begins.

During the blowing phase S1, the pressure in the container increases until the blowing pressure PM1 is reached (which is between 20 and 40 bars, and approximately 22 bars in the example shown in the figure). The pressure PM1 is then maintained until the end of the blowing phase S1, which typically lasts for approximately 900 ms.

Finally, the degassing phase D1 starts in order for the pressure in the container to drop from the blowing pressure PM1 until atmospheric pressure is reached at the end of the production cycle. The degassing phase D1, which lasts for approximately 280 ms, is carried out via a network of valves and ducts, starting from the blowing nozzle and leading to an exhaust muffler.

As can be seen in FIG. 2, according to the first alternative of the production process according to the invention, the blowing curve CS2 has a pre-blowing phase PS2 which ends when the pressure in the container reaches approximately 5 bars for a duration comparable to that of FIG. 1, i.e. approximately 200 ms.

Once the pre-blowing PS2 is completed, the blowing phase S2 begins.

During the blowing phase S2, the pressure in the container increases until a blowing pressure PM2 of between approximately 20 bars and 40 bars (approximately 20 bars in the example illustrated) is reached. This blowing pressure PM2 is then maintained until the end of the blowing phase S2 which lasts for approximately 1120 ms.

Finally, the degassing phase D2 starts, in order for the pressure in the container to drop from the blowing pressure PM2 until atmospheric pressure is reached at the end of the production cycle. The degassing phase thus lasts for approximately 130 ms.

The degassing phase D2 of this first alternative of the process according to the invention comprises a first sub-phase SP21 and a second sub-phase SP22.

The first sub-phase SP21 is begun at the end of the blowing phase S2. During this first sub-phase SP21, the gas under pressure in the container formed is discharged from the container via a network of valves and ducts starting from the blowing nozzle, and leading to an exhaust muffler, as in the case of a conventional process, such as the one illustrated by FIG. 1.

The first sub-phase SP21 advantageously ends when the pressure in the container is situated between 14 bars and 3 bars.

In the example illustrated in FIG. 2, the first sub-phase SP21 has a duration of approximately 60 ms.

Upon completion of the first sub-phase SP21, the second sub-phase SP22 is begun. During this second sub-phase SP22, the gas under pressure which remains in the container formed is discharged from the container directly to the exterior, giving rise to spacing ET2 of the nozzle from the mold. The spacing of the nozzle is triggered when the residual pressure in the container reaches the value of a set pressure CP2.

The set pressure CP2 can be set between 14 bars and 3 bars, for example to 10 bars.

Thus, according to this first alternative of the process, in which the spacing of the nozzle is begun after the degassing has been started by the standard degassing circuit, the spacing of the nozzle from the mold can thus be begun at the choice of the operator of the production unit, in an intermediate pressure range of between 14 bars and 3 bars, during the phase of degassing of the container.

Spacing of the nozzle when the pressure in the container formed is higher than 14 bars would be liable to give rise to noise nuisance, which would have to be compensated for with appropriate equipment, although the effectiveness of spacing at a higher pressure, or immediately after the end of the blowing sequence (or at the end of the forming sequence) would be real. In fact, putting the interior of the container into contact with the open air gives rise to immediate expansion of the gas contained in the container towards the atmosphere, thus generating an expansion noise, the intensity of which is proportional to the volume of the degassed packaging, and to the internal pressure of the container when it is put into contact with the open air.

At the pressure of 14 bars (approximately), there is a balance between the duration of the degassing and the noise nuisance. In fact, the spacing of the nozzle from the mold gives rise to a sudden expansion of the gas under pressure in the container formed. Substantial noise nuisance is associated with this expansion. The noise nuisance depends on the pressure in the container and on the associated volume of gas at the moment when putting into contact with the open air takes place, such that, the greater the pressure, the greater the noise nuisance. Thus, it has been found that, above 14 bars, the noise nuisance which is caused by the spacing of the nozzle from the mold becomes too great, to the extent that solutions aimed at reducing this noise nuisance in order to comply with world industrial safety standards could become complex or costly to implement. Preferably, the set value will be selected at approximately 12 bars, since, at this level, the saving in the duration of the degassing compared with the conventional degassing mode continues to be very significant. Tests carried out with 2-litre containers have shown that spacing created at 12 bars makes it possible to reduce the duration of the degassing by more than 40% compared with a process according to the prior art, whereas spacing of the nozzle which is begun at the end of the forming sequence for its part makes it possible to reduce the duration of the degassing by slightly more than 50% compared with a process according to the prior art. The saving which is obtained with spacing begun at a pressure of approximately 12 bars will thus be preferential to that which is begun at the end of the forming sequence, since it is very close in terms of saving, and less restrictive in relation to the control of noise nuisance. However, preferably, systems which are intended to reduce the noise induced by this degassing will advantageously be placed around the blowing molds.

Below the pressure of 3 bars, the advantage of spacing of the nozzle becomes low, or even non-existent. In fact, during degassing, the pressure decreases all the more rapidly, the higher the initial pressure is. In other words, with a given pressure discharge flow rate, the pressure differential reached during a degassing phase in a given time interval will be greater for a high initial pressure (between 14 and 40 bars) than for a low initial pressure (lower than 3 bars).

In comparison with the blowing curve CS1 of the standard process, represented in broken lines in this FIG. 2, the following points are determined.

Firstly, the duration of the blowing phase S2 of this first alternative of the process according to the invention is greater than the duration of the blowing phase S1 of the standard process.

In fact, the blowing phase S2 of the first alternative of the process according to the invention lasts for 1120 ms, whereas the blowing phase S1 of the standard process lasts for only 900 ms.

The difference DS12 between the duration of the blowing phase S2 of the first alternative of the process according to the invention and that of the blowing phase S1 of the standard process is thus 220 ms.

The value of this difference corresponds to the increase, resulting from the production process according to the invention (blowing curve CS2), in the time of maintenance of the plastics material against the walls of the mold, which makes it possible to obtain a container with better mechanical properties than with a standard production process (blowing curve CS1).

Secondly, the blowing pressure PM2 which is necessary during implementation of the first alternative of the process according to the invention is lower than the blowing pressure PM1 of the standard process. In fact, the increase in the maintenance time S2 makes it possible to maintain or improve the taking of an impression, while reducing the need to have a high blowing pressure, resulting in the use of a lower blowing pressure PM2.

In fact, the same type of container requiring a blowing pressure PM1 of 22 bars with a standard process can be obtained thanks to the process according to the invention with a blowing pressure PM2 of 20 bars.

The saving of 2 bars makes it possible to reduce the energy consumption of the production units (for 2-liter containers, this corresponds to 4 liters of compressed air saved per container. This represents a saving of 160,000 liters of air per hour for equipment producing 40,000 containers per hour).

Furthermore, the installations which are designed to bring the gas under pressure to the production unit can have a reduced size, which also makes them less costly to put into place and to maintain.

In an embodiment according to the first alternative, it is an operator of the production unit, in other words a person responsible for controlling it, who determines the set pressure CP2, whereas the spacing ET2 of the nozzle is controlled automatically by the automaton (CPU) of the production unit, in order for the unit to operate at this value. It will be appreciated that this thus includes incorporation of, and compensation for, the response times of the units (actuators) which control the nozzle in the machine program.

In a so-called "automatic" mode, in a self-learning mode, after having blown a bottle with a degassing duration suitable for degassing of the entire bottle by the standard circuit, the automaton can also determine at what ideal pressure lifting of the nozzle must take place. In this mode, it is thus the automaton which will determine the pressure at which the nozzle must be lifted so as to reconcile the saving in time during the blowing phase and the acceptable noise limit. In this mode, it can thus be conceived that the machine will be equipped with a sensor indicating the associated noise level. Once the optimal value has thus been determined, this pressure value for the control of lifting of the nozzle would therefore be applied to all the blowing stations. In this mode, the noise sensor could also act as a continuous safety loop, and thus act automatically on this set pressure if the noise level were to change.

It should be noted that, since, according to this first alternative the spacing of the nozzle is caused when the pressure in the container has dropped to a predetermined level, the invention can easily be adapted to production units which operate with a high blowing pressure (typically 40 bars).

With reference to FIG. 3, the blowing curve CS3 according to the second alternative of the process according to the invention has a pre-blowing phase PS3 which ends when the pressure in the container reaches approximately 5 bars, at the end of a duration of approximately 220 ms.

Once the pre-blowing PS3 has ended, the blowing phase S3 starts.

During the blowing phase S3, the pressure in the container increases until it reaches a blowing pressure PM3 of approximately 20 bars. The blowing pressure PM3 is then maintained until the end of the blowing phase S3. The blowing phase S3 lasts for approximately 1150 ms.

According to the implementation represented of this second alternative, the spacing ET3 of the nozzle is caused immediately upon completion of the blowing phase (i.e. with a delay SP31 set by the operator to 0 ms), in order for the degassing phase D3 to start immediately towards the exterior, without passing via valves or ducts starting from the nozzle. The duration of the degassing phase D3 is approximately 100 ms (i.e. D3=SP31+Sp32, where SP31=0).

In such a case, where the spacing is started immediately after the blowing (interval of time equal to 0), the degassing phase is carried out entirely thanks to the spacing of the nozzle from the mold.

Consequently, the return to atmospheric pressure takes place rapidly after the blowing phase. It is thus possible to maintain the material which constitutes the container formed against the walls of the mold for longer, whilst maintaining the same cycle time. The mechanical characteristics and the quality of taking an impression of a container formed are thus improved.

However, as previously stated, when the pressure in the container formed is greater than 14 bars, premature spacing of the nozzle has a disadvantage in terms of noise nuisance, although the effectiveness of premature spacing is real. Nevertheless, it should be noted that nuisance of this type, including that caused when the pressure in the container reaches 20 bars, is less than that which would be caused by premature spacing in the case when the blowing pressure reaches 40 bars, but this nuisance must nevertheless be attenuated by appropriate means (sound insulation panels, for example).

With a time SP31 set to 0, and in comparison with the blowing curve CS1 of the standard process, the following points are determined.

Firstly, the duration of the blowing phase S3 according to the second alternative of the process according to the invention is longer than the duration of the blowing phase S1 of the standard process.

In fact, for the example cited for 2-liter containers produced at a unit pace of 1800 bottles/hour/mold, the blowing phase S3 according to the second alternative of the process according to the invention lasts for 1150 ms, whereas the blowing phase S1 of the standard process lasts for only 900 ms.

The difference in the duration of blowing DS13 between the blowing phase S3 according to the second alternative of the process according to the invention and the blowing phase S1 of the standard process is thus 250 ms.

The maintenance of the plastics material against the walls of the mold makes it possible to obtain a container with better mechanical properties and better quality of taking of an impression during the implementation of the second alternative of the process according to the invention (blowing curve CS3) than with the standard production process (blowing curve CS1). It is interesting to note that, by using the invention described in relation with the second alternative, with a time SP31 set to 0, and with the same blowing pressure as that used in standard mode, a container produced at a unit pace of 1800 bottle/hour/mold in standard mode could be produced at a unit pace of 2300 bottles/hour, whilst having the same blowing maintenance time (900 ms). This potential saving of pace is thus extremely substantial and advantageous. At present, for the purpose of speeding up the production paces, all the manufacturers are seeking to optimize their kinematics, but these savings are leading only to optimizations of blowing time of a few milliseconds, which ultimately do not really improve the performance levels. A saving of 250 ms, as cited in the example described, is impossible to envisage by means of conventional kinematic optimizations.

Secondly, in order to obtain an identical container for a cycle with the same duration, the blowing pressure PM3 necessary in the second alternative of the process according to the invention is lower than the blowing pressure PM1 which would be necessary with a standard process: with the example described, a blowing pressure PM3 of 20 bars is sufficient to produce a container which would require a blowing pressure PM1 of 22 bars with a standard process. There is therefore a pressure difference dP13 of 2 bars.

As in the case of the first alternative, a difference of this type makes it possible to reduce the energy consumption of the production units by the same order of greatness. Furthermore, the installations which are designed to bring the gas under pressure to the production unit can be simplified, since the circuits and valves which are connected to the nozzles no longer need communication with exhaust circuits, or mufflers, which also makes them less costly to design and maintain.

FIG. 4 shows a variant of the second alternative of the process according to the invention as described in FIG. 3. In this variant, the time SP31 which sets the time starting from which the spacing of the nozzle will be effective is set to a few milliseconds, for example 30 ms. Several differences can be noted in comparison with the blowing curve CS1 (standard process):

in the example cited, for 2-liter containers with a unit pace of 1800 bottles/hour/mold, the blowing phase S3 according to the second alternative of the process according to the invention lasts for 1120 ms, whereas the blowing phase S1 of the standard process lasts for only 900 ms. The difference dS13 of duration of blowing between the blowing phase S3 according to the second alternative of the process according to the invention and the blowing phase S1 of the standard process is thus 220 ms;

the second alternative has the advantage of permitting control of the spacing of the nozzle by means of a time and not by means of a set pressure, which makes possible greater simplicity of the implementation system. In fact, this second alternative does not require equipment making it possible to detect that the residual pressure in the container reaches the value set by a set pressure, such as the one CP2 described in relation to FIG. 2. In this mode, the spacing ET3 of the nozzle is controlled with a set time SP31. This set time SP31 can be determined by the user or by the automaton which controls the machine. On the basis of the data obtained, consisting of the set blowing pressure PM3 and the volume of the article blown, in fact it is easy to determine automatically, according to the data stored, the time SP31 which is necessary to be able to obtain an optimal blowing time while respecting the maximum noise levels permissible.

The time SP31 can also be determined automatically by control of a loop which associates it with the measurement of the noise level of the machine. In this case, it is the measurement of the noise level in decibels and the associated acceptable set threshold which will determine the optimal time SP31.

In FIG. 5 there is comparison of the blowing curve CS2 of the first alternative and a set pressure which is set to 10 bars, and the blowing curve CS3 according to the second alternative, with a time SP31 set to 0.

The difference between these two blowing curves begins at the start of their respective degassing phase D2, D3.

More specifically, it is found that the degassing phase D2 of the blowing curve CS2 of the first alternative is begun before the degassing phase D3 of the second alternative.

There is therefore a difference of 30 ms at the start of each of these two degassing phases D2, D3.

Thus, on the blowing curve CS3 of the second alternative, the material which constitutes the container is maintained against the walls of the mold for 30 s ms more than on the blowing curve CS2 of the first alternative.

It can also be seen that the pressure becomes identical for the two blowing curves CS2, CS3 starting from the instant when the nozzle is spaced from the mold in the first alternative (start of the sub-phase SP22), i.e. approximately when the pressure in the container is 10 bars. This is made possible in particular thanks to the spacing ET3 of the nozzle as soon as the degassing phase starts, in the case when the duration SP31 is set to 0, in the second alternative, which makes possible a more rapid pressure drop than when the gas under pressure is discharged by the nozzle, as is the case in the first sub-phase SP21 of the first alternative.

The saving in the time of maintenance of the material against the walls of the mold (30 ms) obtained by the blowing curve CS3 according to the second alternative of the process, with a time SP31 set to 0, is relatively slight, in order to have an advantage which is clearly better than degassing according to the blowing curve CS2 of the first alternative.

Also, in order to limit the acoustic insulation equipment of the production units, preference will be given to production of containers according to the blowing curve CS2 of the first alternative, or according to the blowing curve CS3 of the second alternative, but with a time SP31>0, which is determined during regulations of the installation, such that the spacing is begun when the pressure is low enough for the noise generated by the expansion to the open air to be acceptable with the implementation of noise absorption systems.

The second alternative can be implemented in particular when the production process is designed for articles produced with a low blowing pressure, typically lower than 20 bars. Relatively low pressures are now used thanks to recent progress made in bi-orientation equipment, in the resins, or also in the bottle designs. In fact, this progress makes it possible to produce certain articles at below 20 bars (pressures of approximately 14 bars are more often used); particular resins such as polyolefins even permit use of production pressures which are lower still (10 bars). Putting into the open air which is rapid, or immediately at the end of the blowing, can then be envisaged, without taking into account the pressure reached in the container at the end of blowing, since the noise generated by the degassing will remain acceptable without needing to put complex equipment into place in order to reduce this noise.

In addition, in an entirely automated industrial space in which the acceptable noise conditions are greater than those of an industrial space which accommodates production technicians, or in the case when the blowing pressures PMx would be very low (<15 bars), production of containers according to the blowing curve CS3 according to the second alternative of the process, with a time SP31 set to 0, could be preferable.

FIG. 6 shows two superimposed blowing curves, CS4 and CS5, one of them, CS4, in broken lines, this being the blowing curve of a process which uses a hot mold according to the prior art, and the other one, CS5, in solid lines, this being the blowing curve of a process which uses a hot mold according to the invention.

The process represented on the curve CS4 comprises a sequence of forming by stretching-blowing, including a pre-blowing phase PS4 and a blowing phase S4. The forming sequence is followed by a degassing phase D4.

During the forming sequence, the pre-blowing phase PS4 ends when the pressure in the container reaches approximately 5 bars. The duration of this phase is comparable to that of the prior processes (typically between 100 ms and 250 ms).

Once the pre-blowing PS4 has ended, the blowing phase S4 starts.

The blowing phase S4 comprises a first sub-phase, known as the blowing sub-phase S41, during which a gas under high blowing pressure is injected, such that the pressure in the container increases until a blowing pressure PM4 of approximately 40 bars is reached. The blowing pressure PM4 is then maintained until the end of the blowing sub-phase S4. The blowing phase S4 lasts for approximately 1150 ms, with a sub-phase S41 of 850 ms. Upon completion of the blowing sub-phase S41, a sweeping sub-phase B41 begins, which consists of giving rise to controlled escape (portion E41 of the curve CS4) of the gas contained in the container, until a remaining pressure MP41 is obtained (on the curve CS4) in the interior of the container (the pressure MP41 is generally between 8 bars and 12 bars). Then, after the remaining pressure MP41 has been reached, the gas continues to be injected via one or a plurality of holes provided in the stretching rod, while the controlled escape continues, such as to maintain the remaining pressure MP41 during a period of approximately 300 ms.

Then, upon completion of the sweeping sub-phase B41 (in other words upon completion of the blowing phase S4), the degassing phase D4 (typically between 140 and 200 ms) starts, in order for the pressure in the container to drop from the remaining pressure MP41 until atmospheric pressure is reached at the end of the production cycle. The degassing phase B41 is carried out via a network of valves and ducts starting from the blowing nozzle, and leading to an exhaust muffler.

When the invention is applied to hot molds, it leads to a blowing curve CS5, which, like the curve CS4, comprises a sequence of forming by stretching-blowing, including a pre-blowing phase PS5 and a blowing phase S5. The forming sequence is followed by a degassing phase D5.

During the forming sequence, the pre-blowing phase PS5 ends when the pressure in the container reaches approximately 5 bars. The duration of this phase is comparable to that of the prior processes (typically between 100 ms and 250 ms).

Once the pre-blowing PS5 is completed, the blowing phase S5 starts.

The blowing phase S5 comprises a first sub-phase, known as the blowing sub-phase S51 during which a gas under high blowing pressure is injected, such that the pressure in the container increases until a blowing pressure PM5 of approximately 40 bars is reached. The blowing pressure PM5 is then maintained until the end of the blowing sub-phase S51. The blowing phase S5 lasts for approximately 1290 ms. Upon completion of the blowing sub-phase S51, a sweeping sub-phase B51 begins, which consists of giving rise to controlled escape (portion E51 of the curve CS5) of the gas contained in the container, until a remaining pressure MP51 is obtained (on the curve CS5) in the interior of the container, of between 8 bars and 12 bars. Then, after the remaining pressure MP51 has been reached, gas continues to be injected via one or a plurality of holes provided in the stretching rod, while the controlled escape continues, such as to maintain the remaining pressure MP51 during a period of approximately 400 ms.

According to the invention, the degassing phase D5, in order to make the internal pressure of the container drop from the remaining pressure to atmospheric pressure, is begun by giving rise to spacing ET5 of the nozzle immediately upon completion of the blowing phase S5, in other words upon completion of the sweeping sub-phase B51 (i.e. with a period SP51 which is set by the operator to 0 ms), in order for the degassing phase D5 to start immediately towards the exterior, without passing via valves or ducts starting from the nozzle. The degassing phase D5 lasts for approximately 70 ms (i.e. D5=SP51+SP52, where SP51=0).

In fact, in this particular case of the hot molds, since the remaining pressure MP51 is between 8 and 12 bars, it is such that it permits immediate degassing (the pressure range of 8 to 12 bars incorporates the intermediate pressure range, between 14 and 3 bars).

Thus, since the spacing ET5 is begun immediately after the blowing (time interval equal to 0), the degassing phase is carried out entirely thanks to the spacing of the nozzle from the mold.

Therefore, the return to atmospheric pressure takes place rapidly after the blowing phase S5. It is thus possible to maintain the material which constitutes the container formed for longer against the walls of the mold, whilst maintaining the same cycle time. This therefore improves the mechanical characteristics and the quality of taking of an impression of a container formed.

With a time SP51 set to 0, and in comparison with the blowing curve CS4 of the process with hot molds according to the prior art, the following points are determined.

Firstly, the duration of the blowing phase S5 according to the invention is longer than the duration of the blowing phase S4 of the process with hot molds according to the prior art.

In fact, for the example cited for 0.5-liter containers, each produced at a unit pace of 1600 bottles/hour/mold, the blowing phase S5 according to the invention lasts for 1290 ms, whereas the blowing phase S4 of the process with hot molds according to the prior art lasts for only 1150 ms.

The difference in the duration of blowing dS45 between the blowing phase S5 according to the invention and the blowing phase S4 of the process with hot molds according to the prior art is thus 140 ms.

The longer maintenance of the plastics material against the walls of the mold makes it possible to obtain a container with better mechanical properties, and a better quality of taking of an impression during the implementation of the invention (blowing curve CS5) than with the production process with hot molds according to the prior art (blowing curve CS4).

The invention claimed is:

1. A process for production of a container by blowing starting from a pre-form made of plastics material within a production unit, the production unit comprising a mold defining an impression for the container to be formed, and a nozzle which is designed to close the mold hermetically, the production process comprising:
    a sequence of forming by blowing, with a blowing phase (S2; S3; S5) comprising at least the injection and maintenance of a gas under pressure in the pre-form, via the nozzle, in order to deform the pre-form until it matches the impression of the mold, and obtain a container;
    a phase of degassing (D2; D3; D5) of the container formed, consisting of discharging the gas contained in the container at the end of the forming sequence, in order to take the interior of the container to atmospheric pressure,
    wherein, during the degassing phase (D2; D3; D5), the nozzle is spaced (ET2; ET3; ET5) from the mold in order to interrupt the hermetic closure, so as to put the interior of the container into direct fluid communication with the atmosphere, the spacing of the nozzle being begun:
    after the beginning of the degassing phase (D2; D3), when the pressure in the interior of the container has dropped and has reached an intermediate pressure which is lower than the pressure at the end of the forming sequence, and is between 14 and 3 bars; or
    after completion of the blowing phase (S2; S3; S5), at a predetermined instant which takes place within an interval of time of between 0 and 200 ms after the stoppage of the injection of gas into the container and at a pressure not above approximately 14 bars.

2. The production process as claimed in claim 1, wherein the sequence of forming by blowing is accompanied by axial stretching of the pre-form.

3. The production process as claimed in claim 2, wherein the process is implemented in a hot mold, and wherein it comprises a sweeping sub-phase (B51) which takes place during the blowing phase (S5) immediately before the degassing (D5), and during which controlled escape of gas is caused and a sweeping gas is injected into the container, and upon completion of which sub-phase a pressure (MP51) of between 8 and 12 bars remains in the container, and the spacing (ET5) of the nozzle is begun immediately at the end of the degassing sub-phase (D5), upon stoppage of the injection of sweeping gas into the container.

4. The production process as claimed in claim 1, wherein the spacing (ET2) of the nozzle relative to the mold is begun during the phase of degassing (D2) of the container, after the degassing has been started by a degassing circuit of the production unit, when the intermediate pressure in the container formed reaches the value of a set pressure (CP2).

5. The production process as claimed in claim 4, wherein the set pressure (CP2) which controls the spacing of the nozzle (ET2) from the mold is set to between 14 and 3 bars.

6. The production process as claimed in claim 4, wherein the set pressure (CP2) which controls the spacing of the nozzle (ET2) is determined by an operator of the production unit, in other words by a person in charge of its control.

7. The production process as claimed in claim 4, wherein the set pressure (CP2) which controls the spacing (ET2) of the nozzle is determined by an automaton of the production unit, according to data of pressure of blowing (PM2) and of the volume of the article produced, or according to a noise measurement.

8. The production process as claimed in claim 1, wherein the spacing (ET3) of the nozzle from the mold is controlled after completion of the blowing phase, and after stoppage of the injection of gas into the container, by means of a set time (SP3).

9. The production process as claimed in claim 8, wherein the set time (SP31) which controls the spacing (ET3) of the nozzle relative to the mold is between 0 and 200 ms.

10. The production process as claimed in claim 8, wherein the set time (SP31) which controls the spacing (ET3) of the nozzle is determined by an operator of the production unit, in other words by a person in charge of its control.

11. The production process as claimed in claim 8, wherein the set time (SP31) which controls the spacing (ET3) of the nozzle is determined by an automaton of the production unit, according to a noise measurement carried out in the production unit.

12. The production process as claimed in claim 2, wherein the spacing (ET2) of the nozzle relative to the mold is begun during the phase of degassing (D2) of the container, after the degassing has been started by a degassing circuit of the production unit, when the intermediate pressure in the container formed reaches the value of a set pressure (CP2).

13. The production process as claimed in claim 5, wherein the set pressure (CP2) which controls the spacing of the nozzle (ET2) is determined by an operator of the production unit, in other words by a person in charge of its control.

14. The production process as claimed in claim 5, wherein the set pressure (CP2) which controls the spacing (ET2) of the nozzle is determined by an automaton of the production unit, according to data of pressure of blowing (PM2) and of the volume of the article produced, or according to a noise measurement.

15. The production process as claimed in claim 6, wherein the set pressure (CP2) which controls the spacing (ET2) of the nozzle is determined by an automaton of the production unit, according to data of pressure of blowing (PM2) and of the volume of the article produced, or according to a noise measurement.

16. The production process as claimed in claim 2, wherein the spacing (ET3) of the nozzle from the mold is controlled after completion of the blowing phase, and after stoppage of the injection of gas into the container, by means of a set time (SP3).

17. The production process as claimed in claim 9, wherein the set time (SP31) which controls the spacing (ET3) of the nozzle is determined by an operator of the production unit, in other words by a person in charge of its control.

18. The production process as claimed in claim 9, wherein the set time (SP31) which controls the spacing (ET3) of the nozzle is determined by an automaton of the production unit, according to a noise measurement carried out in the production unit.

* * * * *